United States Patent
Malvar et al.

(10) Patent No.: US 8,351,694 B2
(45) Date of Patent: Jan. 8, 2013

(54) ADAPTIVE COMPRESSION OF MULTI-LEVEL IMAGES

(75) Inventors: Henrique S. Malvar, Sammamish, WA (US); Erin L Renshaw, Kirkland, WA (US)

(73) Assignee: Neiversan Networks Co. LLC, Dover, DE (US)

( * ) Notice: Subject to any disclaimer, the term of this patent is extended or adjusted under 35 U.S.C. 154(b) by 0 days.

(21) Appl. No.: 13/156,991

(22) Filed: Jun. 9, 2011

(65) Prior Publication Data

US 2012/0014596 A1 Jan. 19, 2012

Related U.S. Application Data

(63) Continuation of application No. 10/916,721, filed on Aug. 12, 2004, now Pat. No. 7,991,238.

(60) Provisional application No. 60/567,150, filed on Apr. 30, 2004.

(51) Int. Cl.
*G06K 9/36* (2006.01)

(52) U.S. Cl. ........................ 382/166; 382/232

(58) Field of Classification Search ........... 382/232–253
See application file for complete search history.

(56) References Cited

U.S. PATENT DOCUMENTS

| | | | |
|---|---|---|---|
| 5,581,637 A | 12/1996 | Cass et al. | |
| 6,067,555 A | 5/2000 | Hayashi | |
| 6,426,809 B1 | 7/2002 | Hayashi et al. | |
| 6,570,612 B1 | 5/2003 | Saund et al. | |
| 6,606,418 B2 | 8/2003 | Mitchell et al. | |
| 6,681,056 B1 | 1/2004 | Tseng et al. | |
| 6,701,012 B1 | 3/2004 | Matthews | |
| 6,728,426 B1 | 4/2004 | Zlotnick | |
| 7,158,669 B2 | 1/2007 | Tanaka et al. | |
| 7,177,483 B2 | 2/2007 | Saund | |
| 7,600,183 B2 | 10/2009 | Stern et al. | |
| 2003/0007695 A1* | 1/2003 | Bossut et al. | ............... 382/239 |
| 2003/0048944 A1 | 3/2003 | De Bonet | |
| 2003/0048954 A1 | 3/2003 | Matthews | |
| 2003/0103669 A1 | 6/2003 | Bucher | |
| 2003/0182630 A1 | 9/2003 | Saund et al. | |
| 2003/0198381 A1* | 10/2003 | Tanaka et al. | ............... 382/166 |
| 2004/0042680 A1 | 3/2004 | Saund | |
| 2004/0165786 A1 | 8/2004 | Zhang et al. | |

(Continued)

FOREIGN PATENT DOCUMENTS

JP  08-331391  12/1996

(Continued)

OTHER PUBLICATIONS

A. Poulakidas, et al., Experimental Studies on a Compact Storage Scheme for Wavelet-based Multiresolution Subregion Retrieval. In Proc. NASA Combined Industry, Space, and Earth Science Data Compression Workshop, 1996, 10 pages.

(Continued)

*Primary Examiner* — Chan S Park
*Assistant Examiner* — Sean Motsinger
(74) *Attorney, Agent, or Firm* — Turocy & Watson, LLP

(57) ABSTRACT

The invention facilitates adaptive compression of multi-level images, such as captured digital images of a whiteboard, etc., encoding a bitstream comprising a color image component and a black-and-white image component. Either or both of a color and a black-and-white image can be output to a user based on user desires, receiving device capabilities, etc.

37 Claims, 9 Drawing Sheets

U.S. PATENT DOCUMENTS

2004/0233844 A1 11/2004 Yu et al.
2009/0189902 A1 7/2009 Bowkett et al.

FOREIGN PATENT DOCUMENTS

| JP | 2001-223903 | 8/2001 |
| JP | 2001-230937 | 8/2001 |
| JP | 2002-094805 | 3/2002 |
| JP | 2002-218254 | 8/2002 |
| JP | 2003-087558 | 3/2003 |
| JP | 2003-134532 | 5/2003 |
| JP | 2003-348360 | 12/2003 |

OTHER PUBLICATIONS

B. Girod, C.L. Chang, P. Ramanathan, and X. Zhu. Light Field Compression Using Disparity-compensated Lifting. In (submitted) IEEE Int. Conference on Acoustics, Speech, and Signal Processing, 2003, 4 pages.

Jean-Loup Gailly, The GZIP Home Page, 8 pages, http://www.gzip.org, last viewed Sep. 27, 2004.

Morgan Skinner, Optimizing Color Quantization for ASP.NET Images, Microsoft Developer Services, MSDN, 10 pages, http://www.msdn.microsoft.com/library/en-us/dnaspp/html/colorquant.asp?frame=true, last viewed Sep. 27, 2004.

Henrique S. Malvar, Fast Adaptive Encoder for Bi-Level Images, Microsoft Research, 2001 IEEE, pp. 253-262.

C.L. Chang and Xiaoqing Zhu, Light Field Compression Using Disparity-Compensated Wavelet Decomposition, 2003, 7 pages.

EP05103064, European Search Report, mailed Sep. 30, 2005, 3 pages.

Haffner, et al., Browsing through High Quality Document Images with DjVU; Research and Technology Advances in Digital Libraries Proceedings, Apr. 1998, 10 pages.

Misic, et al., Enhancement of Colored Engravings; Multimedia and Expo Proceedings; Aug. 2002, 4 pages.

"ITU Recommendation T.44" International Telecommunication Union Apr. 1999.

Bloomberg, "Color Quantization using Octrees" http://www.leptonica.com/papers Feb. 15, 2003.

Gray "Vector quantization" vol. 1, Issue 2, Part 1, Apr. 1984 pp. 4-29.

"Adaptive color reduction" Papamarkos, N.:Atsalakis, A.E.; Strouthopoulos, C.P.; Systems, Man and Cybernetics, Part B, IEEE Transactions on vol. 32, Issue 1, Feb. 2002 pp. 44-56.

"Basic of Images". Http://www.geom.uiuc.edu/events/courses/1996/cmwh/Stills/basics.html.

Office Action mailed Aug. 1, 2008 for Chinese Application Serial No. 200510070019.4, 4 pages.

Office Action mailed Jan. 16, 2009 for Chinese Application Serial No. 200510070019.4, 3 pages.

EP OA dated Oct. 9, 2009 for European Patent Application No. 05103064.1-2223, 3 pages.

EP OA dated Jul. 25, 2008 for European Patent Application No. 05103064.1-2223, 3 pages.

English Translation of the Official Notice of Rejection for Japanese Patent Application No. 2005-134616, mailed Sep. 19, 2010, 3 pages.

OA dated Nov. 27, 2009 for U.S. Appl. No. 10/916,721, 42 pages.

OA dated Mar. 18, 2008 for U.S. Appl. No. 10/916,721, 23 pages.

OA dated Sep. 9, 2008 for U.S. Appl. No. 10/916,721, 40 pages.

OA dated Apr. 15, 2009 for U.S. Appl. No. 10/916,721, 24 pages.

OA dated Oct. 7, 2010 for U.S. Appl. No. 10/916,721, 48 pages.

Notice of Allowance dated Mar. 24, 2011 for U.S. Appl. No. 10/916,721, 51 pages.

JP OA for Japanese Application No. 2005-134616, 2 pages (untranslated).

* cited by examiner

ADAPTIVE COMPRESSION OF MULTI-LEVEL IMAGES

CROSS-REFERENCE TO RELATED APPLICATIONS

This application claims priority to U.S. Provisional Patent Application Ser. No. 60/567,150 entitled "ADAPTIVE COMPRESSION OF MULTI-LEVEL IMAGES," filed Apr. 30, 2004, the entirety of which application is incorporated herein by reference. This application is also a continuation of U.S. patent application Ser. No. 10/916/721, entitled "ADAPTIVE COMPRESSION OF MULTI-LEVEL IMAGES", filed Aug. 12, 2004, the entirety of which is incorporated herein by reference.

TECHNICAL FIELD

This invention is related to communication in a computer environment, and, more particularly, to compression of data associated with multi-level images.

BACKGROUND OF THE INVENTION

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

Image capture and dissemination is an area of increasing interest in the computer industry. Typically, there are three basic classes of images, or bitmaps. Fore example, full color images comprise millions of possible colors per pixel. Each pixel as three color coordinates $\{R,G,B\}$, each represented with 8 to 16 bits. Full color bitmaps are typically presented in JPEG (Joint Photographic Experts Group), JPEG2000, or PNG (Portable Network Graphics) format. Color-mapped images comprise a few possible colors per pixel. Each pixel usually has a value that is an index into a color table containing $\{R,G,B\}$ values for each color. Color-mapped images are often presented in GIF (Graphics Interchange Format) or PNG formats. Bi-level images (facsimiles) employ two colors per pixel, usually black and white, and are typically employed for document images. As such, bi-level images are often displayed in TIFF (Tagged Image File Format) or PNG format.

An unmet need exists in the art for systems and methods that facilitate improved image compression and enhanced image presentation.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, relates to a system that facilitates compression of images produced by whiteboard and/or document capture systems. Typically, there are three classes of images, each of which is best compressed by a codec or algorithm for that particular class of image. The subject invention provides a codec for color-mapped images, and in particular, color-mapped images produced by capturing an image of a whiteboard. Typically, in connection with such images, a majority of pixels have a background color (e.g., white), and a minority of pixels have a color that can be approximated by one of several colors (e.g., that can be selected from a table of predefined colors). A color table can have relatively few hues, as typical dry-erase pens are limited in the number of colors, hues, etc., in which they are manufactured—a whiteboard image is considered a multi-level image, wherein each pixel value is an index to a short table of color values (e.g., "levels").

According to an aspect of the invention, a compression algorithm for efficient representation of multi-level images is provided, via a multi-level codec (MLC). Color mapped images typically have a few possible colors per pixel. Each pixel usually has a value that is an index into a color table containing $\{R,G,B\}$ values for each color. Common codecs for color-mapped images include GIF and PNG. The MLC facilitates better compression of color-mapped images than common GIF or PNG formats. Furthermore, typical encoded bitstreams include components that can be decoded separately, representing black-and-white and color versions of the image. Thus when bandwidth is limited, a black-and-white version of the image can be decoded from a small portion of the encoded bitstream.

According to a related aspect of the invention, dual-compression functionality can be provided, such that compression of an input image can occur in two stages. First, a background/foreground flag for each pixel is compressed to effectively compress a black-and-white representation of the image—this can be achieved via, for example, a bi-level codec compressor. Then, color index information for the foreground pixels can be compressed by way of an entropy encoder (e.g., from the Ziv-Lempel (LZ) family). This aspect of the invention facilitates enhancement of, for example, remote meeting collaboration, information exchange, whiteboard content sharing, etc. Furthermore, the MLC facilitates quality image compression to mitigate potentially detrimental bandwidth limitations. If bandwidth is severely limited, the present invention can partition encoded information into black-and-white and color versions, and then transmit only the black-and white version to comply with bandwidth constraint (e.g., transmission over a hard-wire line, wireless, etc.)

According to another aspect of the invention, a foreground/background image $b(m,n)$ can be encoded with a bi-level encoder such as bi-level codec (BLC). Colormap size can be selectively reduced via vector quantization or similar procedure. A string (or vector) formed by all foreground pixel values can be encoded with an entropy coder, such as an LZ encoder. For example, a BLC coder can be employed to encode a black-and-white image $b(m,n)$, and an LZ77-based zlib library can be utilized to encode foreground colors. Other kinds of bi-level coders (e.g. TIFF, PNG) and string coders (e.g. other LZ variants) can additionally be utilized in conjunction with the present invention.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
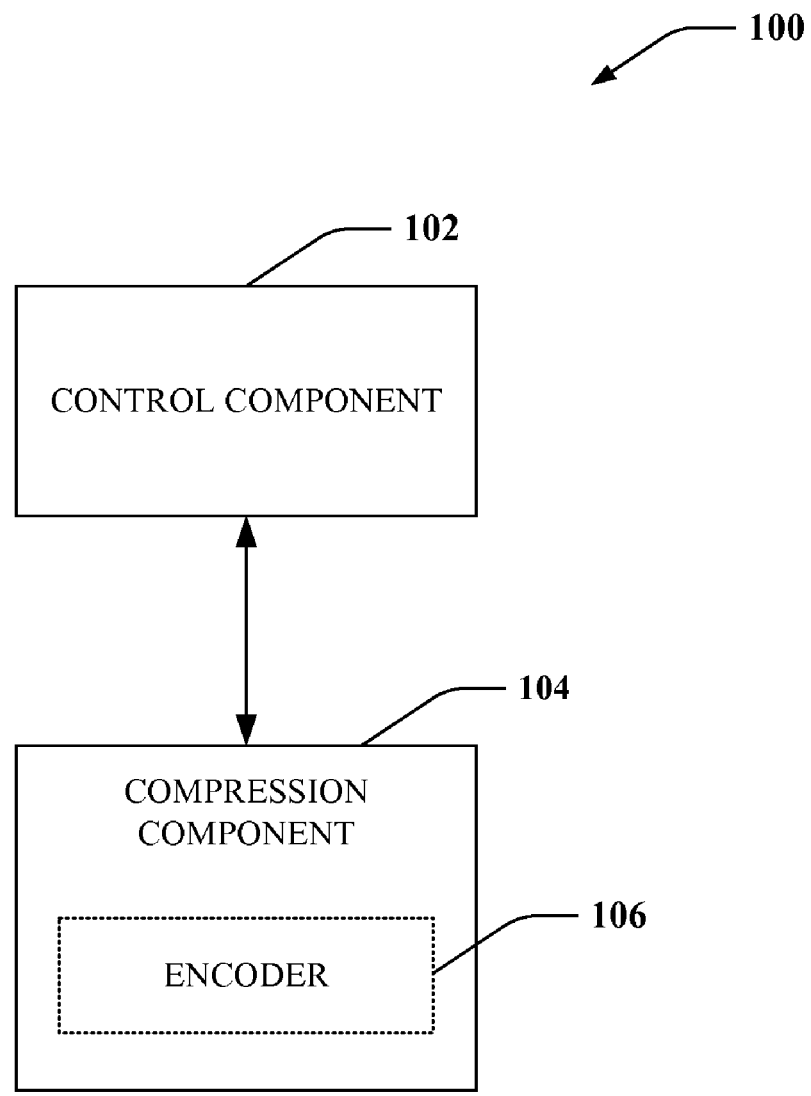
FIG. 1 is an illustration of a system 100 that facilitates adaptive compression of multi-level images, such as digitally captured images of a whiteboard, etc., in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 4:
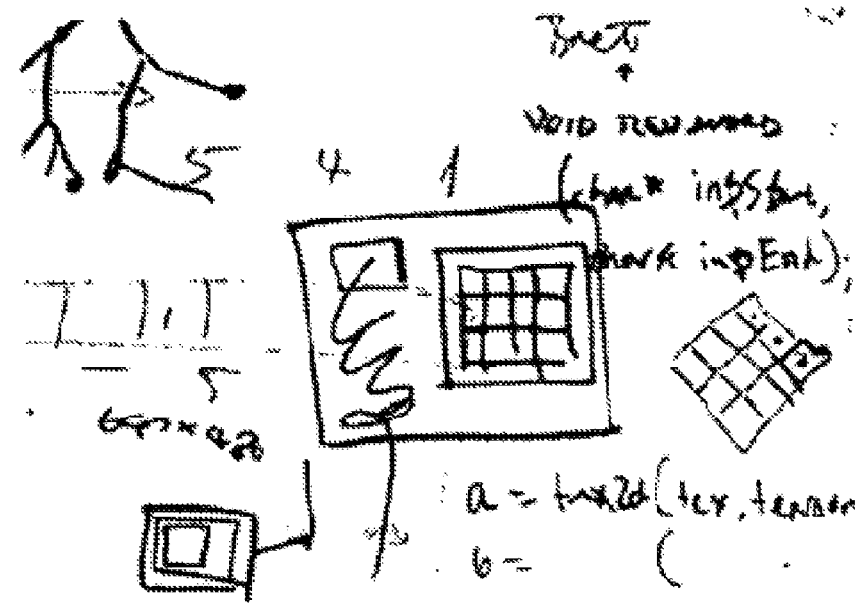
FIG. 4 illustrates a typical digital image produced by a whiteboard capture system.

The present invention provides a codec for color-mapped images, and in particular, color-mapped images produced by capturing, for example, a color image of a whiteboard (See, e.g., FIG. 4). Such images comprise a majority of pixels having a background color (e.g., white), and a minority of pixels that have a color that can be approximated by one of several colors in a small table of colors. The color table can have relatively few hues, as typical dry-erase pens are limited in the number of colors, hues, etc., in which they are manufactured. A whiteboard image is considered a multi-level image, wherein each pixel value is an index to a short table of color values (e.g., "levels").

Color mapped images typically have a few possible colors per pixel. Each pixel usually has a value that is an index into a color table containing $\{R,G,B\}$ values for each color. Common codecs for color-mapped images include GIF and PNG. The multi-level codec (MLC) facilitates better compression of color-mapped images than common GIF or PNG formats. Furthermore, typical encoded bitstreams comprise components that can be decoded separately, representing black-and-white and color versions of the image. Thus when bandwidth is limited, a black-and-white version of the image (See, e.g., FIG. 5) can be decoded from a small portion of the encoded bitstream.

FIG. 1 is an illustration of a system 100 that facilitates adaptive compression of multi-level images, such as digitally captured images of a whiteboard, etc., in accordance with an aspect of the present invention. A control component 102 is operatively coupled to a compression component 104 that provides dual-compression functionality to the system 100 to compress multi-level images, such as a digitally captured whiteboard. The compression component 104 comprises an encoder 106 that employs a multi-level codec (MLC), which is an algorithm for compressing a multi-level image. The encoder component 106 typically generates a compressed representation (a bitstream and/or a file) of the original image composed of several parts, among them header information (containing information about image dimensions, number of colors, and other similar parameters), the encoded background, and the encoded foreground color string, as described in the following.

For example, an image $x(m,n)$, $0 \leq m \leq N_R-1$, $0 \leq n \leq N_C-1$ (where $N_R$ and $N_C$ are the number of rows and the number of columns, respectively) can be input to the system 100. Each pixel $x(m,n)$ can have a value v in the range $[0 \ldots L-1]$, where L is the number of colors. The actual color values are stored in a color map $M=\{[r_0\ g_0\ b_0],[r_1\ g_1\ b_1],\ldots,[r_{L-1}\ g_{L-1}\ b_{L-1}]\}$, where, for every color index $0 \leq v \leq L-1$ there is a triplet of RGB values that determine its corresponding color. Thus, the input data is the set of pixel values $x(m,n)$ and the colormap M. The compression component 104, in conjunction with the control component 102, can determine the background color $v_B$ of the input image. Since most pixels are of the background color, $v_B$ can be set equal to the color value v assumed by the largest number of pixels. Usually $v_B$ is close to white, but other background colors are possible. A header can be written for the compressed bitstream (or file) containing the values of $N_R$, $N_C$ and $v_B$. This header can be designed to leave space for a colormap, to be defined later.

The compression component 104 and/or entropy encoder 106 can map the original input image into a corresponding black-and-white image b(m,n) by:

$b(m,n)=0$, if $x(m,n)=V_B$ (e.g., the pixel is in the background)

$b(m,n)=1$, if $x(m,n) \neq V_B$ (e.g., the pixel is in the foreground)

Figure 5:
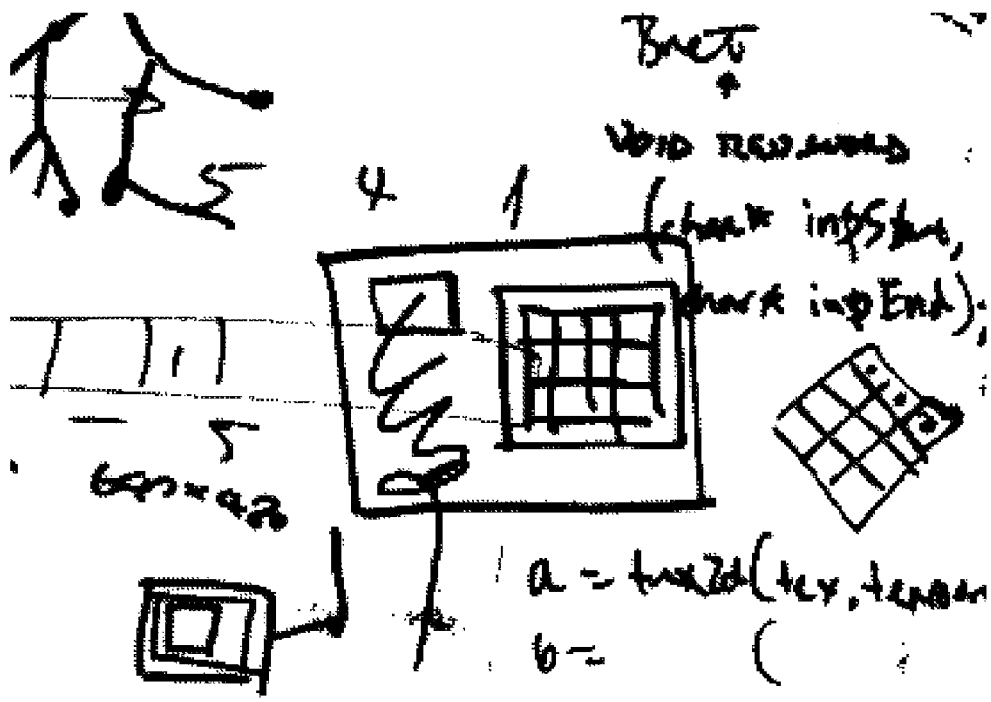
FIG. 5 illustrates a black-and-white image produced corresponding to the color image of FIG. 4.

The black-and-white image b(m,n) can then be encoded with a bi-level codec (BLC) and the bits generated by BLC can be appended to the output bitstream and/or file. An example of the black-white image b(m,n) corresponding to the image in FIG. 4 is shown in FIG. 5. Additionally, the encoder 106 can encode the color values of the foreground pixels. Since the positions of the foreground pixels are already known from the black-and-white image b(m,n), the values of all foreground pixels, in scanning order, can be appended to a string $S=\{v_0, v_1, \ldots, v_{F-1}\}$, where F is the number of foreground pixels (typically, F is much smaller than the total number of pixels $N_R \cdot N_C$).

To encode the string S, the system encoder 106 can employ two modes: a "lossless" mode, wherein the foreground values in S are encoded directly, using an entropy coder appropriate for strings that may contain repeated patterns, such as a Ziv-Lempel (LZ) coder; and a "lossy" mode, wherein the colormap M is reduced to a new colormap M', with fewer colors. The original indices in the image x(m,n) can then be replaced by indices to the new colormap, prior to entropy encoding. If the desired mode is lossless, the string S can be encoded with an LZ encoder and the resulting bits can be appended to the output bitstream or file. The colormap M can then be written to the header of the output bitstream or file to complete encoding.

If the desired mode is lossy, it can be assumed that perfect reconstruction of the colors of the foreground pixels is not desired, so that the colors can be approximated, as long as when displayed they appear sufficiently similar to the original colors. For example, in lossy mode there is an input parameter to the encoder 106, K, the desired number of colors, where K<L. The system 100 can then generate a new colormap $M'=\{[r'_0 g'_0 b'_0], [r'_1 g'_1 b'_1], \ldots, [r'_{K-1} g'_{K-1} b'_{K-1}]\}$, such that for every color [r g b] in the original map M, there is a color [r' g' b'] in the reduced colormap M', such the new color [r' g' b'] is sufficiently similar to the original color [r g b]. Such colormap reduction is an instance of a vector quantization problem: replacing a set of vectors by a smaller set, such that the entries in the smaller set are good approximations to those in the original set. Thus, to produce the new map M', the compression component 104 and/or encoder 106 can employ a vector quantizer design algorithm such as LBG (Linde-Buzo-Gray, also known as K-means in the statistical literature) or an octree algorithm.

Once the system encoder 106 has generated the map M', a standard full-search vector quantization procedure can be employed to reassign colors to indices. For each foreground pixel, the original value v can be replaced by a new value v' via, for example:

For all (m,n) for which b(m,n)==1:
Replace x(m,n)=v by x(m,n)=v', such that the color [r' g' b'] corresponding to v' is the closest color to the original [r g b] color (corresponding to v), for all colors in the reduced colormap M'.

The string S to be encoded can then be formed by the encoder 106, wherein $S=\{v'_0, v'_1, \ldots, v'_{F-1}\}$, and where F is the number of foreground pixels. Since the range of values of each element of S has been reduced, it will compress to a shorter bitstream than the original S corresponding to lossless mode. Thus, in lossy mode, a small reduction in reconstruction fidelity facilitates a large reduction in compressed file size. At this point, the colormap M' can be written to the header of the output bitstream or file to complete encoding.

Figure 2:
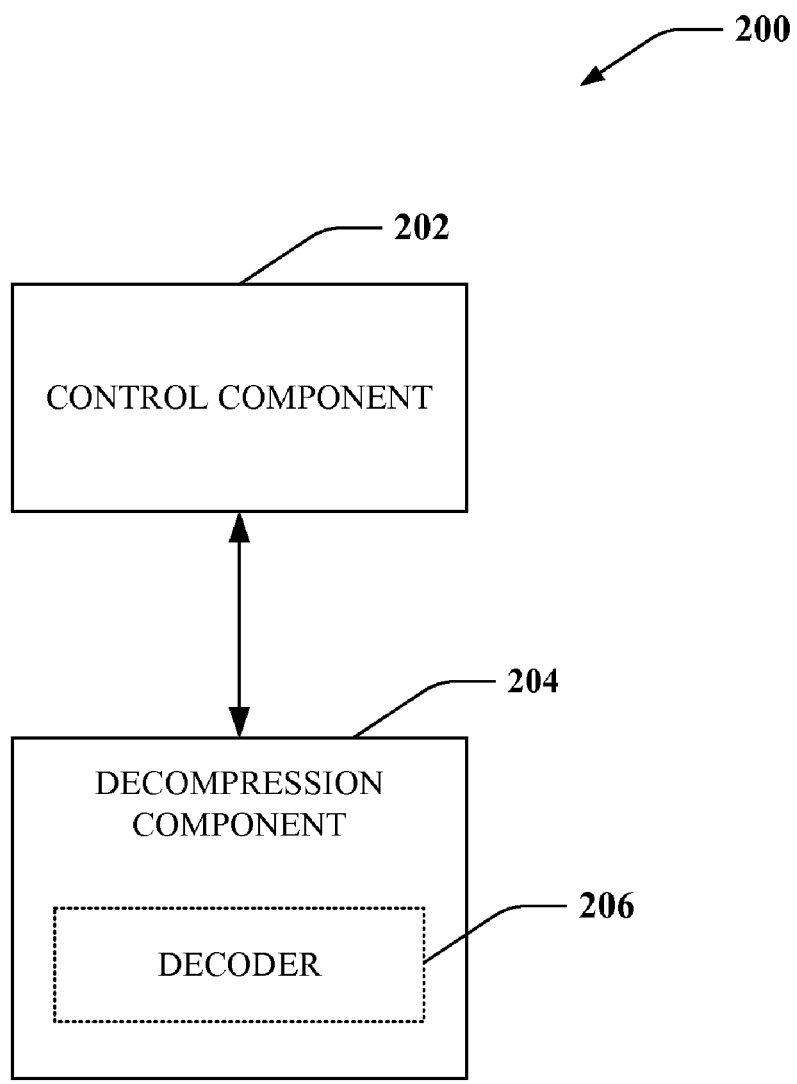
FIG. 2 is an illustration of a system 200 that facilitates adaptive decompression of compressed multi-level images, such as digitally captured images of a whiteboard, etc., in accordance with an aspect of the present invention.

FIG. 2 is an illustration of a system 200 that facilitates adaptive decompression of multi-level images in accordance with an aspect of the present invention. Depending on the application, either the encoder system 100 or the decoder system 200 or both can be present. For example, a printer driver or compressed document producer can contain only the encoder system 100; a file viewer utility or a printer control software can contain only the decoder system 200, and a plug-in into a document/image processing/editing application can contain both the encoder system 100 and the decoder system 200.

The decoder 206 can selectively undo the encoding. The main operation of the decoder 206 can comprise, for example, reading the header of the MLC-generated bitstream or file to determine the parameters of $\{N_R, N_C\}$ (image dimensions), $v_B$ (background color), K (number of colors), and the colormap M. Additionally, the decoder 206 can read and decode the first bitstream component, which contains the encoded black-and-white bitmap b(m,n), and assign the background color $v_B$ to all pixels x(m,n) for which b(m,n)=0. Still furthermore, the decoder 206 can optionally read and decode the second bitstream component, which contains the encoded string S of foreground values, and can optionally assign the color to each foreground indices according to the colormap initially read. Reading and/or decoding of the second bitstream component is not essential when a black-and-white reconstruction of the image is sufficient to meet a user's desires.

Figure 3:
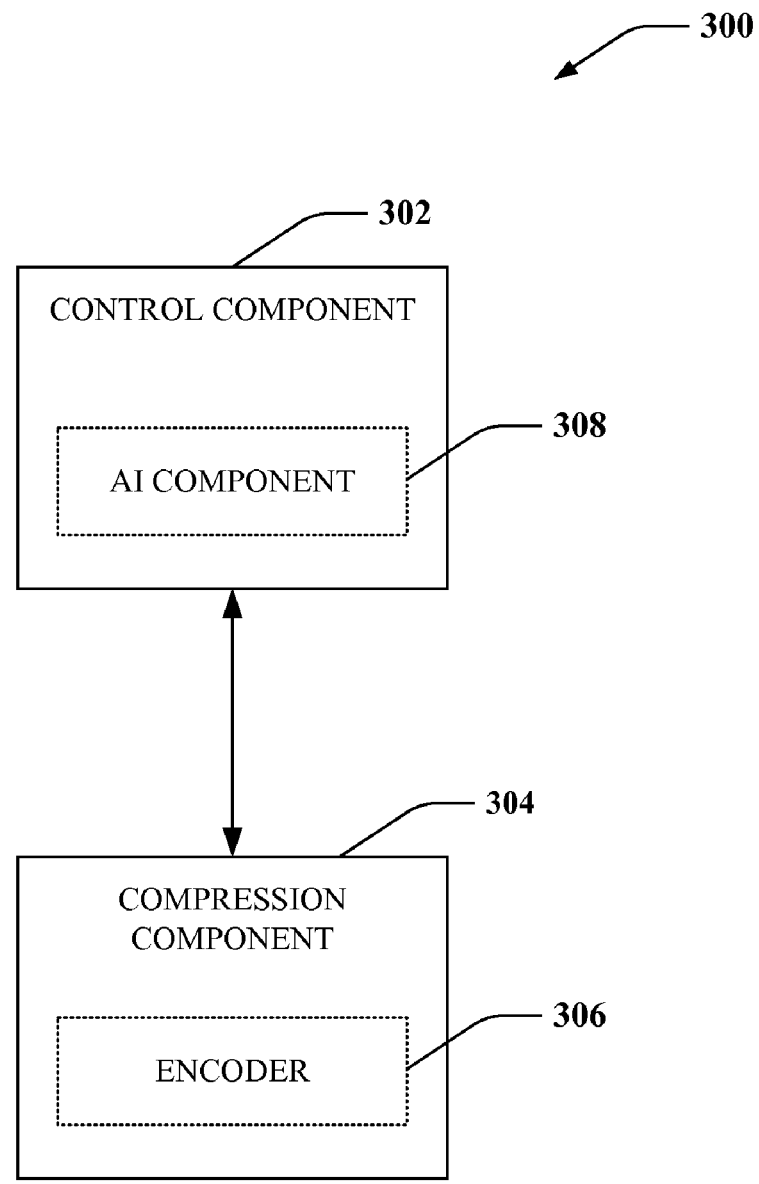
FIG. 3 is an illustration of a system 300 that facilitates adaptive compression of multi-level images, such as digitally captured images of a whiteboard, etc., comprising an artificial intelligence (AI) component that makes inferences, in accordance with an aspect of the present invention.

Now turning to FIG. 3, a system 300 is illustrated that facilitates adaptive compression of multi-level images in accordance with an aspect of the present invention. They system 300 comprises a control component 302 that facilitates analysis of information received by the system 300. The control component is operatively associated with a compression component 304, which in turn comprises an encoder 306.

Additionally, the control component 302 comprises an AI component 308 that can make inferences regarding operation of the system 300. For example, the AI component can infer a proper mode of encoding (e.g., lossless or lossy) depending on information regarding a user's desires, display capabilities of a receiving user device, etc. According to another example, the AI component 308 can infer a proper color table for pixel color in an input image, etc. Furthermore, the AI component 308 can be employed to make determinations and/or inferences regarding, for instance, bandwidth availability, such that if bandwidth is significantly limited, a black-and-white version of an input image can be transmitted without information related to the color of the foreground pixels. In this manner, the system 300 can provide a receiving user with a meaningful representation of the original image while circumventing bandwidth limitations.

According to a related aspect, the AI component 308 can determine and/or infer the type of device that is receiving the compressed image (e.g., based in part on information associated with a request from the receiving device, . . . ), and can employ such inferences to determine whether the device is capable of receiving and/or displaying a multi-level color image. If it is determined that the receiving device is not capable of receiving and/or displaying a multi-level image (e.g., due to bandwidth limitations, device capability limitations, temporary receiving device CPU unavailability, . . . ), then the system 300 can automatically transmit a bi-level image in order to compensate for limitations of the receiving device and still provide meaningful information to a receiving user.

Other instances of inference-making that can be provided by the AI component 308 can include, for example, inferences regarding user preferences. According to one instance, the AI component 308 can assess user-entered preferences, information, etc., in order to infer whether the user desires and/or is capable of receiving a full-color multi-level version of the original image, a reduced-color multi-level version, and/or a bi-level, black-and-white version of the input image. For example, a user receiving a compressed image via a cell phone in a remote area can set the cell phone to "roam," and the AI component 308 can recognize the limited receiving capability of the roaming cell phone to permit inferences to be made regarding the type of compressed image to transmit to the cell phone. Additionally, the user can be provided with information related to the receiving capability of the device as inferred by the AI component 308, such that the user can be prompted to change settings in the receiving device in order to permit an image of greater or lesser quality to be received.

Furthermore, the system 300 can present a user interface to a user, which provides supplemental information, such as file size associated with compressed images of different quality levels, user-selectable options regarding transmission and/or reception resources, transmission priority, file content, download time as a function of receiving device capability, suggestions to reduce download time and/or increase receiving capability, etc. Any and all information necessary to enhance the user's viewing experience can be provided to the user via the user interface. It is to be understood that the preceding examples are illustrative in nature, and are not intended to limit the scope of the manner in which the AI component 308 makes inferences, or the number of inferences that can be made by the AI component 308.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

FIGS. 4 and 5 are presented for illustrative purposes, exemplifying a typical whiteboard image (FIG. 4) as it can appear after digital capture. Colored lines in FIG. 4 are represented by lines of varying shades. Where bandwidth constraints dictate, a black-and-white image (FIG. 5) corresponding to the color image (FIG. 4) can be presented to a user, to facilitate information exchange with such a user despite limited bandwidth and/or limited receiving device capabilities. For example, in the event that an image of a whiteboard and its contents are captured and transmitted to a receiving device of minimal graphical capabilities, such as a handheld with a simple LCD screen, a fax machine, etc., the system can be set to provide a black-and-white image that can be easily interpreted and displayed by the handheld device.

While, for purposes of simplicity of explanation, the one or more methodologies shown herein, e.g., in the form of a flow chart, are shown and described as a series of acts, it is to be understood and appreciated that the present invention is not limited by the order of acts, as some acts can, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 6:
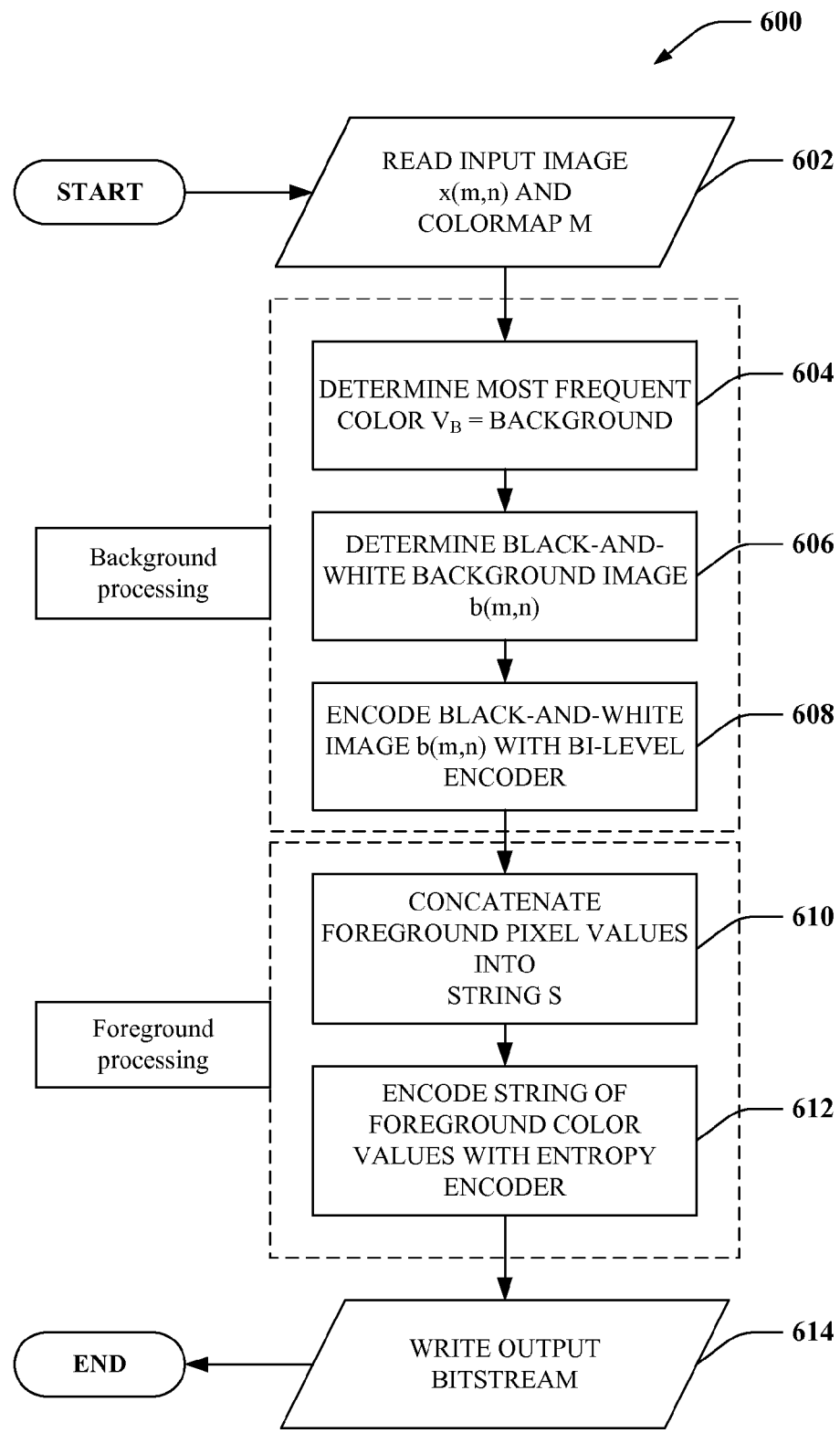
FIG. 6 is an illustration of a methodology 600 that facilitates constructing a black-and-white image from a color image via an iterative feedback loop that evaluates each pixel in the color image, in accordance with an aspect of the present invention.

FIG. 6 illustrates a methodology 600 for adaptive compression of multi-level images, such as digitally captured images of a whiteboard, etc., in accordance with an aspect of the present invention. At 602, an input image x(m,n) and associated color map can be read. After the input image x(m,n) and associated color map have been read at 602, background processing can begin, which comprises various actions illustrated at 604-608. At 604, a determination is made regarding the most frequent color $v_B$=background color. At 606, a black-and-white image b(m,n) can be determined, which can be encoded via a bi-level encoder at 608. Background processing is illustrated in greater detail in FIG. 7. It is to be appreciated that the method illustrated as 602-608 can be implemented without the foreground processing described below if a black-and-white is all that is desired, such that an output bitstream can be written based on data associated with the image b(m,n) as encoded by the bi-level encoder.

The method can then proceed to 610, where foreground pixel values can be concatenated into String S based on M'. At 612, the string of foreground color values, string S, can be encoded via an entropy encoder. Finally, at 614, an output bitstream can be written utilizing the encoded String S from 612 and the encoded black-and-white image information from 608. Thus 610 and 612 illustrate actions that can occur during foreground processing, which is illustrated in further detail with reference to FIG. 8.

Figure 7:
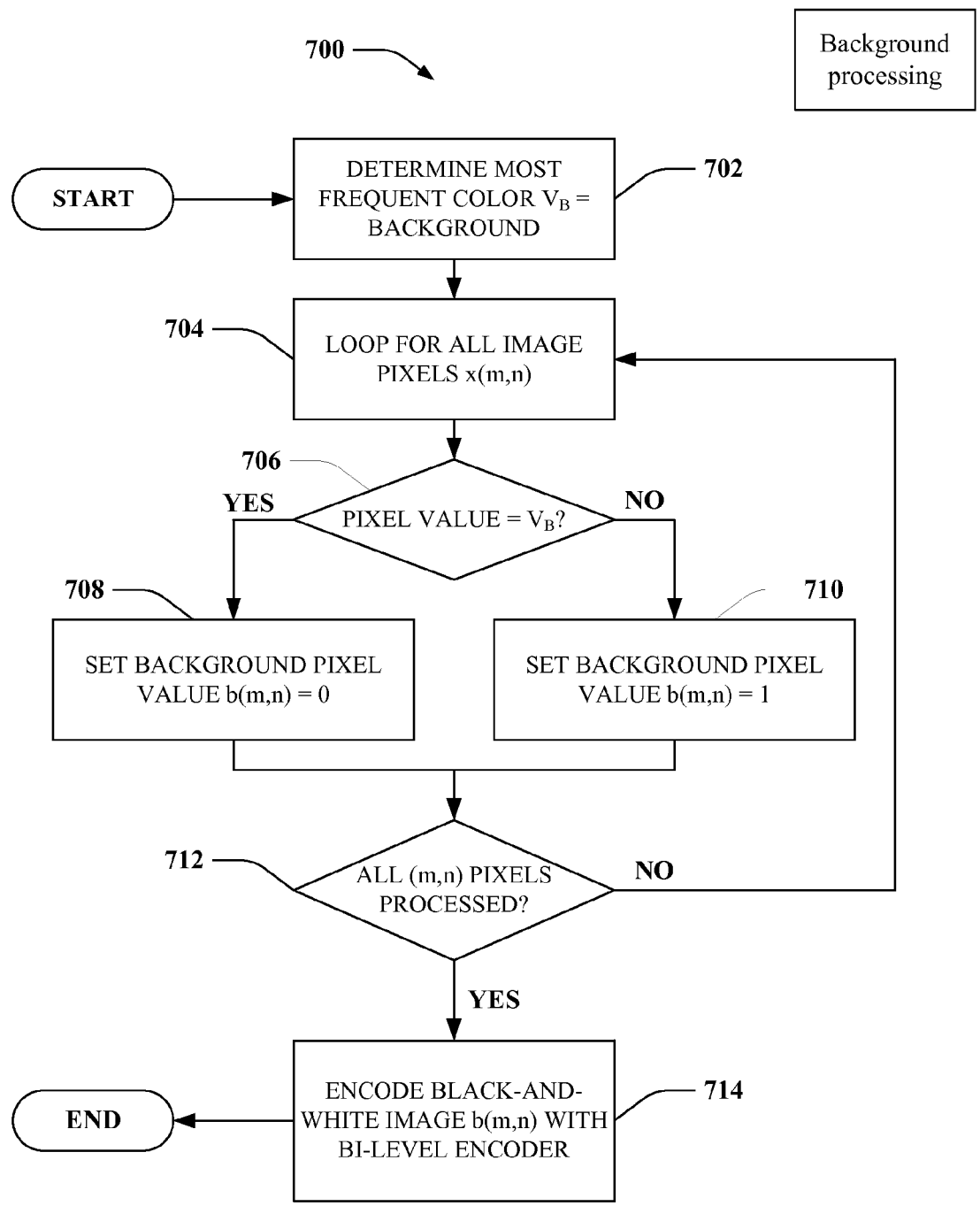
FIG. 7 is an illustration of a methodology 700 that facilitates adaptive compression of multi-level images with optional color-map reduction prior to compression, in accordance with an aspect of the present invention.

FIG. 7 illustrates a methodology 700 for adaptive compression of multi-level images and conversion thereof into bi-level images, in accordance with an aspect of the present invention. At 702, a determination is made regarding a most frequently occurring color, $v_B$, in an image, such that the most frequently occurring color $v_B$ is designated as the "background" color. For instance, an input image can comprise a set of pixels x(m,n), such that $0 \leq m \leq N_R-1$, $0 \leq n \leq N_C-1$ (where $N_R$ and $N_C$ are the number of rows and the number of columns, respectively). Each pixel in the image can have a color value v in the range [0 . . . L−1], where L represents the number of possible colors. Actual color values associated with the pixels ca be stored in a color map, M, where M={[$r_0$ $g_0$ $b_0$], [$r_1$ $g_1$ $b_1$], . . . , [$r_{L-1}$ $g_{L-1}$ $b_{L-1}$]}, where, for every color index $0 \leq v \leq L-1$ there is a triplet of RGB values that determine its corresponding color. For example, if the image to be compressed and/or converted is a digital photograph of a populated whiteboard, then the vast majority of pixels comprised by the image will exhibit the color white. If such as case, the color white will be assigned to $v_B$. Therefore, the background color $v_B$ can be determined, for example, via a histogram computation: the number of occurrences of each color is computed, and $v_B$ is assigned to the color with the largest count.

At 704, a loop is initiated to cycle through the set of all pixels x(m,n) in the image, and, at 706, a determination is made regarding whether each individual pixel exhibits a value equal to $v_B$. If a given pixel x(m,n) at a specific location (m,n) is determined to have a color value equal to that of $v_B$, then the corresponding background flag value b(m,n) is set to zero. If the pixel color value is determined not to be equal to $v_B$, then at 710, the corresponding background flag value b(m,n) for the particular pixel is set to 1, that is, the value "1" represents a non-background color. I other words, b(m,n)=1 represents that location (m,n) corresponds to a foreground pixel. If desired, a header that comprises the values for $N_R$, $N_C$, and $v_B$ can be written for the compressed bitstream and/or file. Additionally, the header can be constructed with additional space designated for information related a colormap.

Once a particular pixel has been evaluated and assigned a value, then a determination can be made as to whether all pixels (m,n) in the image have been processed at 712. If it is determined at 712 that the set of all pixels (m,n) has not been evaluated, then the method can revert to 704 for another iteration of pixel evaluation, i.e. with a new pair of pixel addresses (m,n). If, however, the determination at 712 indicates that the entire set of pixels (m,n) has been processed, then the original image x(m,n) can be mapped into a corresponding black-and-white image b(m,n), where b(m,n)=0 if x(m,n)=$v_B$, and b(m,n)=1 if x(m,n)≠$v_B$. The method can then proceed to 714, where a black-and-white image b(m,n) can be encoded via, for example, a bi-level encoder. Bits encoded by the bi-level encoder can then be appended to the output bitstream and/or file.

Figure 8:
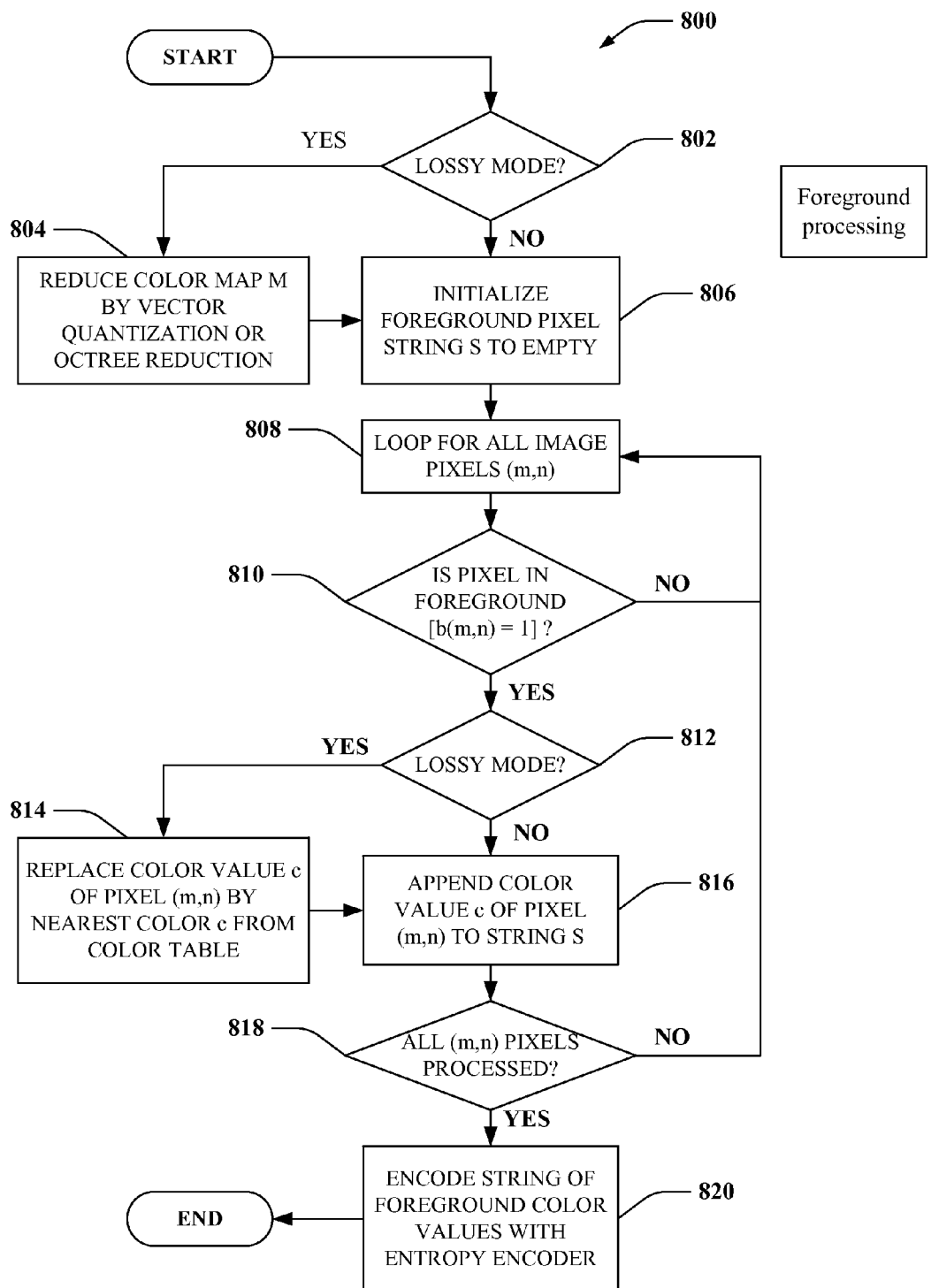
FIG. 8 is an illustration of a methodology 800 that facilitates adaptive compression of multi-level images, such as digitally captured images of a whiteboard, etc., in accordance with an aspect of the present invention.

FIG. 8 illustrates a methodology 800 for adaptive compression of multi-level images, such as digitally captured images of a whiteboard, etc., in accordance with an aspect of the present invention. At 802, a determination can be made regarding whether a lossy mode is desirable when compressing data associated with a captured image. For example, typical lossy data compression codecs are employed in conjunction with streaming media, telephony, etc. According to one example, a lossy transform codec can be employed, wherein samples of an image can be selected, parsed into small segments, transformed into a new basis space, and finally quantized and entropy encoded. According to another example, a lossy predictive codec can be employed in conjunction with the present invention, via which previously decoded data can be used to predict the current image. Error between the predicted and actual data can then be quantized and encoded. According to still another example, a combination of transform and predictive lossy codecs can be employed.

If a lossy mode is selected, then the method can proceed to 804, where the colormap, M, can be reduced by vector quantization techniques, octree reduction, centroid analysis techniques, etc. Lossy mode is desirable to improve compression of complicated images. For example, a whiteboard can be populated using a single color (e.g., blue) on a white background. If the blue marker has been used to overwrite other markers (e.g., red, black, etc.) as commonly occurs, then the blue marker used to populate the whiteboard will also deposit such other colors on the whiteboard. Pixels that have color values that differ from the two most frequent pixel color values (e.g., white background and blue marker) can be dropped to provide a bare minimum of pixels required to represent true blue markings on a white background. It is to be appreciated that the specific colors given in the preceding example are not to be taken in a limiting sense, as other colors of backgrounds and/or markers are contemplated by the present invention, as are other image subjects, in addition to whiteboards.

Additionally, if the whiteboard is populated with a plurality of colors, some of which are dominant, the lossy mode can be employed to reduce a color map M to M', where M' comprises the set of most dominant colors. For example, if blue, green, and red markers are used primarily to populate the whiteboard, but an orange marker is used to draw a single line thereon, then the color map M, comprising blue, green, red, and orange, can be reduced to M', which comprises blue, red and green. According to this scenario, the orange line can be represented in red, as red is the closest pixel color to orange in the reduced color map M'.

At 806, a foreground pixel string S can be initialized to "empty". Additionally, if the determination at 802 indicates that lossy mode is not desired, then the method can proceed directly to 806 for initialization of the foreground pixel string S without reducing the colormap M. Then, at 808, a loop can be initiated for all pixels (m,n) in the image. At 810, a determination can be made regarding whether a given pixel is in the foreground (e.g., b(m,n)=1) as determined with respect to the methodology 700. If the pixel is determined not to be a foreground pixel (e.g., it is a background pixel such that b(m,n)=0), then the method can revert to 808 for further iterations on remaining pixels. If, at 810, it is determined that the pixel is a foreground pixel, then a determination is made at 812 as to whether lossy mode is desired. If lossy mode is desired, then at 814 the color value c of the pixel (m,n) can be replaced by the nearest color c from the reduced color map M'. At 816, the new color value c of the pixel (m,n) can be appended to the string S.

In the event that it is determined that lossy mode is not desirable at 812, the method can proceed directly from 812 to 816, where the color value c of the pixel (m,n) will be appended to the string S. Then, at 818, a determination can be made as to whether all pixels (m,n) have been processed. If fewer than all pixels in the complete set have been processed, then the method can revert to 808 for further iterations of pixel analysis. If, at 818, it is determined that all pixels have been evaluated, then the method can proceed to 820, where the string S of foreground color values can be encoded via an entropy encoder (e.g., from the Ziv-Lempel (LZ) family).

It should be noted that FIGS. 6, 7, and 8 present flow charts 600, 700, and 800, which are preferred embodiments for adaptive compression of multi-level images according to the present invention. For those skilled in the art, it is possible to use variations on the flow charts 600, 700, and 800, so that the order of operations can be modified, e.g. to better suit a particular hardware platform; such variations are still embodiments of the present invention.

It should also be noted that the flow charts 600, 700, and 800 specify a preferred embodiment of the encoder 106. Form the operations specified in those flow charts, a person skilled in the art can derive corresponding flow charts for the decoder 206.

Figure 9:
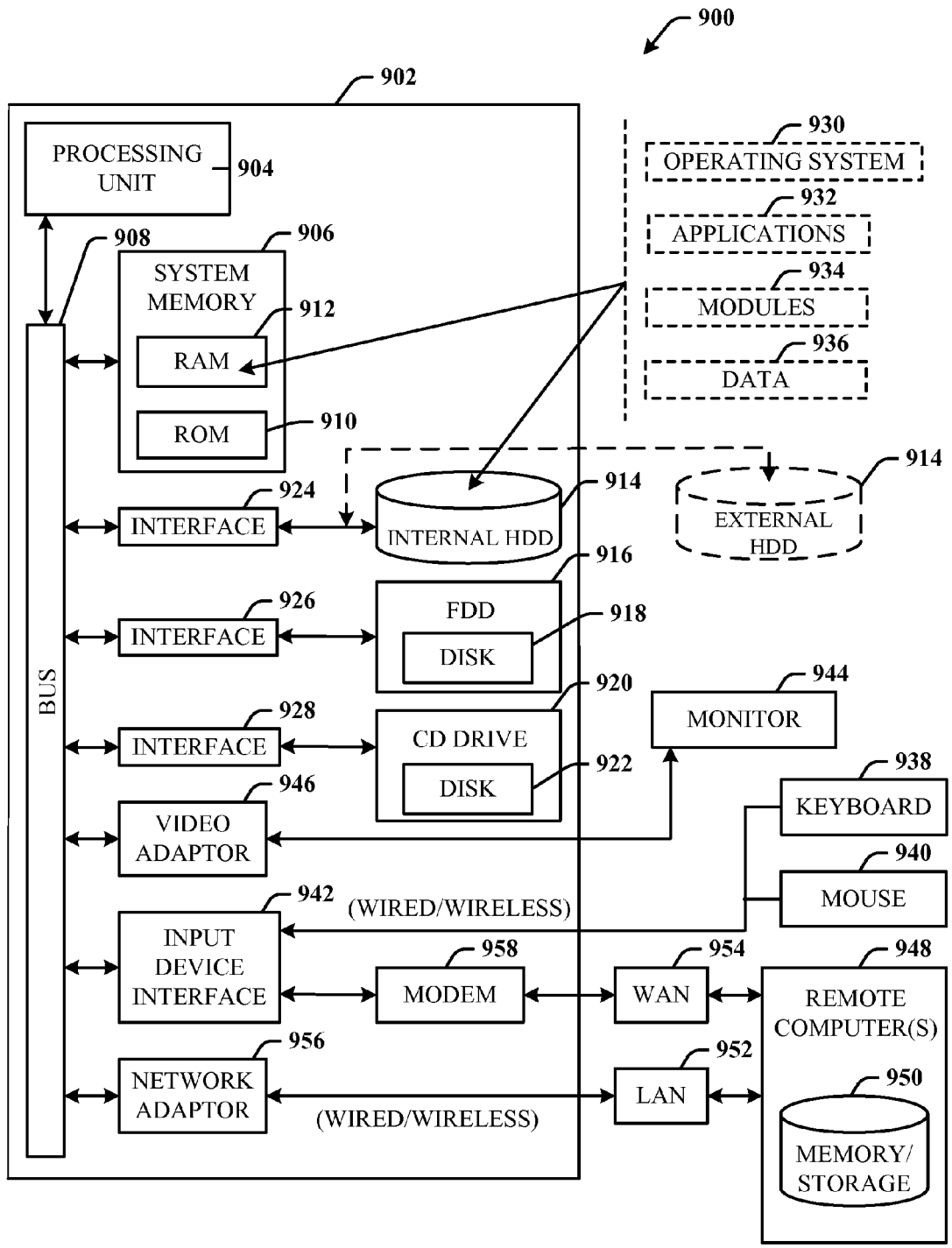
FIGS. 9 and 10 illustrate exemplary computing environments in accordance with various aspects of the present invention.

Referring now to FIG. 9, there is illustrated a block diagram of a computer operable to execute the disclosed architecture. In order to provide additional context for various aspects of the present invention, FIG. 9 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 9, there is illustrated an exemplary environment 900 for implementing various aspects of the invention includes a computer 902, the computer 902 including a processing unit 904, a system memory 906 and a system bus 908. The system bus 908 couples system components including, but not limited to, the system memory 906 to the processing unit 904. The processing unit 904 may be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up.

The computer 902 further includes a hard disk drive 914, a magnetic disk drive 916, (e.g., to read from or write to a removable disk 918) and an optical disk drive 920, (e.g., reading a CD-ROM disk 922 or to read from or write to other high capacity optical media such as Digital Video Disk (DVD)). The hard disk drive 914, magnetic disk drive 916 and optical disk drive 920 can be connected to the system bus 908 by a hard disk drive interface 924, a magnetic disk drive interface 926 and an optical drive interface 928, respectively. The drives and their associated computer-readable media provide nonvolatile storage of data, data structures, computer-executable instructions, and so forth. For the computer 902, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 912, including an operating system 930, one or more application programs 932, other program modules 934 and program data 936. It is appreciated that the present invention can be implemented with various commercially available operating systems or combinations of operating systems.

A user can enter commands and information into the computer 902 through a keyboard 938 and a pointing device, such as a mouse 940. Other input devices (not shown) may include a microphone, an IR remote control, a joystick, a game pad, a satellite dish, a scanner, or the like. These and other input devices are often connected to the processing unit 904 through a serial port interface 942 that is coupled to the system bus 908, but may be connected by other interfaces, such as a parallel port, a game port, a universal serial bus ("USB"), an IR interface, etc. A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 may be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include a local area network (LAN) 952 and a wide area network (WAN) 954. Such networking environments are commonplace in offices, enterprise-wide computer networks, intranets and the Internet.

When used in a LAN networking environment, the computer 902 is connected to the local network 952 through a wired or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 typically includes a modem 958, or is connected to a communications server on the LAN, or has other means for establishing communications over the WAN 954, such as the Internet. The modem 958, which may be internal or external and a wired or wireless device, is connected to the system bus 908 via the serial port interface 942. In a networked environment, program modules depicted relative to the computer 902, or portions thereof, may be stored in the remote memory storage device 950. It will be appreciated that the network connections shown are exemplary and other means of establishing a communications link between the computers may be used.

The computer 902 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The disclosed computer 902 may also be employed with HiperLAN technology. HiperLAN is a set of wireless local area network (WLAN) communication standards primarily used in European countries. There are two specifications: HiperLAN/1 and HiperLAN/2, both of which have been adopted by the European Telecommunications Standards Institute. The HiperLAN standards provide features and capabilities similar to those of the IEEE 802.11 WLAN standards used in the U.S. and other adopting countries. HiperLAN/1 provides communications at up to 20 Mbps in the 5-GHz range of the radio frequency spectrum. HiperLAN/2 operates at up to 54 Mbps in the same RF band, and is compatible with 3G (third-generation) WLAN systems for sending and receiving data, images, and voice communications. HiperLAN/2 has the potential, and is intended, for implementation worldwide in conjunction with similar systems in the 5-GHz RF band.

Figure 10:
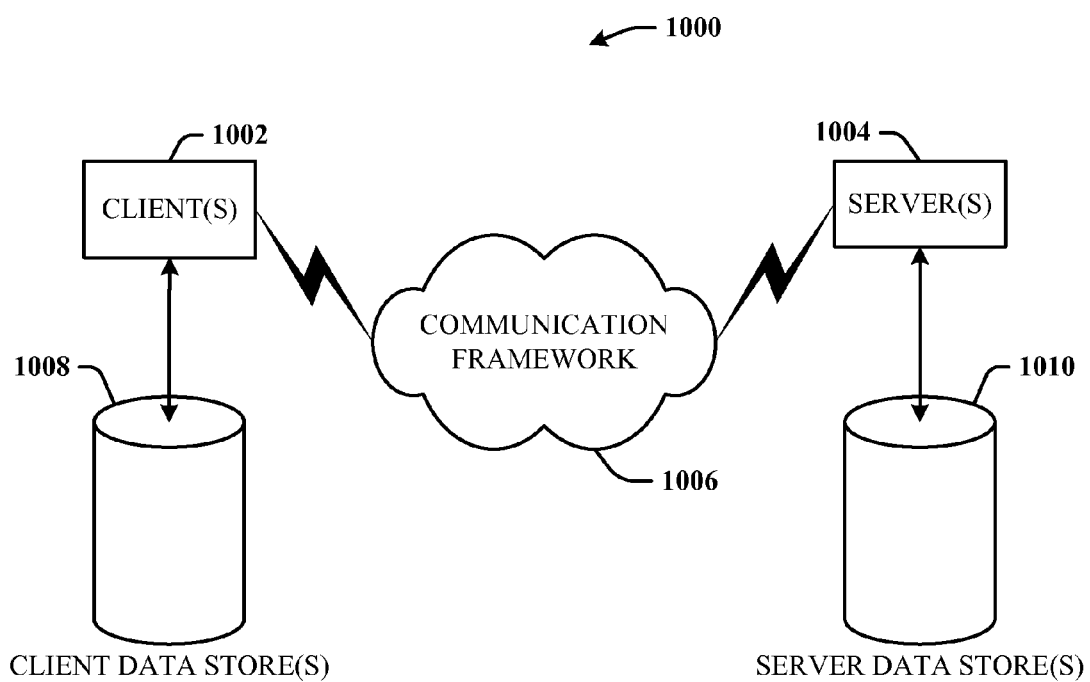

Referring now to FIG. 10, there is illustrated a schematic block diagram of an exemplary computing environment 1000 in accordance with the present invention. The system 1000 includes one or more client(s) 1002. The client(s) 1002 can be hardware and/or software (e.g., threads, processes, computing devices). The client(s) 1002 can house cookie(s) and/or associated contextual information by employing the present invention, for example. The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications may be facilitated via a wired (including optical fiber) and/or wireless technology. The client(s) 1002 are operably connected to one or more client data store(s) 1008 that can be employed to store information local to the client(s) 1002 (e.g., cookie(s) and/or associated contextual information). Similarly, the server(s) 1004 are operably connected to one or more server data store(s) 1010 that can be employed to store information local to the servers 1004.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    determining a most frequently occurring color in a color-mapped image of a physical rendering which is not included in a color table, wherein the color table represents a predefined discrete set of colors known prior to the physical rendering being created, and the colors in the predefined discrete set of colors have respective color values;
    designating the most frequently occurring color which is not included in the color table as a background color and assigning a color value to the background color, wherein the background color value is different from the color values included in the color table;
    determining, for pixels comprising the color-mapped image, whether a pixel of the pixels exhibits a color value equal to a color value associated with the background color;
    setting a flag for the pixel to a background value corresponding to a background pixel in response to the color value of the pixel being equal to the color value associated with the background color;
    setting the flag for the pixel to a foreground value corresponding to a foreground pixel in response to the color value of the pixel being different than the value associated with the background color;
    compressing respective flags for the pixels of the color-mapped image; and
    compressing color value information for foreground pixels of the color-mapped image.

2. The method of claim 1, further comprising compressing a black and white representation of the image employing a bi-level codec compressor.

3. The method of claim 1, further comprising compressing the color value information for the foreground pixels of the image employing a Lempel-Ziv entropy encoder.

4. The method of claim 1, further comprising selectively decoding the color value information or the respective flags to facilitate providing an output image.

5. The method of claim 1, further comprising generating a header corresponding to a compressed file associated with the color-mapped image, the header comprising the value of the background color of the image.

6. The method of claim 5, further comprising mapping the color-mapped image to a corresponding black and white image including setting color values for respective pixels of the pixels as a function of being equal or not equal to the color value associated with the background color of the image.

7. The method of claim 6, further comprising encoding color values of foreground pixels based on determining a location of the foreground pixels in the corresponding black and white image.

8. The method of claim 7, wherein the encoding of the color values of the foreground pixels comprises appending the color values of the foreground pixels, in scanning order, to a string.

9. The method of claim 8, further comprising encoding the string based on a lossless compression scheme.

10. The method of claim 8, further comprising encoding the string based on a lossy compression scheme.

11. The method of claim 1, wherein the compressing the color value information comprises performing an octree reduction.

12. The method of claim 1, wherein the compressing the color value information comprises performing vector quantization.

13. The method of claim 12, wherein the performing the vector quantization comprises employing a Linde-Buzo-Gray algorithm.

14. The method of claim 1, wherein the compressing the color value information comprises minimizing mean-square-error between original colors and encoded colors.

15. A system, comprising:
a control component configured to receive a color-mapped image and determine a mode of encoding the color-mapped image; and
a compression component configured to:
determine a most frequently occurring color in the color-mapped image of a physical rendering which is not included in a color table, wherein the color table is based on a predefined discrete set of colors known prior to creation of the physical rendering, and the colors in the predefined discrete set of colors have respective color values;
designate the most frequently occurring color which is not included in the color table as a background color and assign a color value to the background color, wherein the background color value is different from the color values included in the color table;
determine, for pixels of the color-mapped image, whether a pixel of the pixels exhibits a color value equal to a color value associated with the background color;
set a flag for the pixel to a background value that corresponds to a background pixel in response to the color value of the pixel being equal to the color value associated with the background color;
set the flag for the pixel to a foreground value that corresponds to a foreground pixel in response to the color value of the pixel being different than the value associated with the background color;
compress respective flags for the pixels of the color-mapped image; and
encode a string that comprises background pixel information and foreground pixel information associated with the color-mapped image.

16. The system of claim 15, wherein the compression component is further configured to compress color value information associated with foreground pixels of the color-mapped image.

17. The system of claim 16, wherein the compression component further comprises a Lempel-Ziv entropy encoder configured to compress the color value information.

18. The system of claim 17, wherein the compression component is further configured to compress the background pixel information and the foreground pixel information to construct a black-and-white representation of the color-mapped image.

19. The system of claim 18, wherein the control component is further configured to analyze bandwidth availability to determine a likelihood the black-and-white representation of the color-mapped image or a color representation of the color-mapped image will be successfully transmitted.

20. The system of claim 19, wherein the control component is further configured to partition encoded information into at least one of the black-and-white representation of the color-mapped image or the color representation of the color-mapped image.

21. The system of claim 20, wherein the control component is further configured to transmit the black-and-white representation of the color-mapped image in response to bandwidth availability being below a predetermined threshold.

22. The system of claim 17, further comprises an artificial intelligence component configured to determine whether a device includes a capability to display a color version of the color-mapped image.

23. The system of claim 22, wherein the artificial intelligence component is further configured to employ at least one of a support vector machine, neural network, expert system, Bayesian belief network, fuzzy logic, or a data fusion engine.

24. The system of claim 16, wherein the string of the background pixel information and the foreground pixel information includes a header that comprises information related to at least one of a dimension of the color-mapped image, a background color, a number of colors in the color-mapped image, or a colormap of the color-mapped image.

25. The system of claim 24, further comprises a decoder configured to read the header and string and decode a first bitstream component and a second bitstream component.

26. The system of claim 25, wherein the first bitstream component comprises information related to a bi-level version of a digital image from which the color-mapped image is generated.

27. The system of claim 25, wherein the second bitstream component comprises information related to a color version of a digital image from which the color-mapped image is generated.

28. The system of claim 25, wherein the decoder is further configured to assign a color to a plurality of foreground indices according to the colormap of the color-mapped image.

29. A system, comprising:
a control component configured to analyze information related to a compressed multi-level image created from a color-mapped image of a physical rendering; and
a decoder configured to read an encoded string of background pixel information and foreground pixel information, the encoded string including a header that comprises information related to a background color of the color-mapped image wherein the background color is a most frequently occurring color in the color-mapped image of the physical rendering that is not included in a color table comprising a predefined set of colors known prior to creation of the physical rendering, and wherein, for pixels of the color-mapped image, a pixel is flagged as a background pixel in response to the pixel having a color value equal to the background color, and a pixel is flagged as a foreground pixel in response to the pixel having a color value that is not equal to the background color.

30. The system of claim 29, wherein the decoder further decodes a first bitstream component and a second bitstream component based on the information contained in the encoded string and the header.

31. The system of claim 30, wherein the first bitstream component comprises other information associated with a bi-level representation of the physical rendering from which the color-mapped image is generated.

32. The system of claim 31, further comprising a bi-level decoder decodes the first bitstream component.

33. The system of claim 30, wherein the second bitstream comprises other information related to a color representation of the physical rendering from which the color-mapped image is generated.

34. The system of claim 33, further comprising an entropy decoder that decodes the second bitstream component.

35. The system of claim 29, wherein the decoder assigns a color to a plurality of foreground indices in accordance with the colormap of the color-mapped image.

36. A non-transitory computer readable storage medium comprising computer executable instructions that, in response to execution, cause a computing system to perform operations, comprising:
- determining a most frequently occurring color in a color-mapped image of a physical rendering which is not included in a color table representing a predefined discrete set of colors known prior to creating the physical rendering, wherein the colors in the predefined discrete set of colors have respective color values;
- designating the most frequently occurring color which is not included in the color table as a background color and assigning a color value to the background color, wherein the background color value is different from the color values included in the color table;
- determining, for pixels comprising the color-mapped image, whether a respective pixel of the pixels exhibits a color value equal to a color value associated with the background color;
- setting a flag for the respective pixel to a background value corresponding to a background pixel in response to the color value of the respective pixel being equal to the color value associated with the background color;
- setting the flag for the respective pixel to a foreground value corresponding to a foreground pixel in response to the color value of the respective pixel being different than the color value associated with the background color;
- compressing respective flags for the respective pixels of the color-mapped image; and
- compressing color value information for foreground pixels of the color-mapped image.

37. A system, comprising:
- means for determining a most frequently occurring color in a color-mapped image of a physical rendering which is not included in a color table, wherein the color table represents a predefined discrete set of colors known prior to the physical rendering being created, and the colors in the predefined discrete set of colors have respective color values;
- means for designating the most frequently occurring color which is not included in the color table as a background color and assigning a color value to the background color, wherein the background color value is different from the color values included in the color table;
- means for determining, for pixels comprising the color-mapped image, whether a respective pixel of the pixels exhibits a color value equal to a color value associated with the background color;
- means for setting a flag for the respective pixel to a background value corresponding to a background pixel in response to the color value of the respective pixel being equal to the color value associated with the background color;
- means for setting the flag for the respective pixel to a foreground value corresponding to a foreground pixel in response to the color value of the respective pixel being different than the color value associated with the background color;
- means for compressing respective flags for the respective pixels of the color-mapped image; and
- means for compressing color value information for foreground pixels of the color-mapped image.

* * * * *

UNITED STATES PATENT AND TRADEMARK OFFICE
CERTIFICATE OF CORRECTION

| | | |
|---|---|---|
| PATENT NO. | : 8,351,694 B2 | Page 1 of 1 |
| APPLICATION NO. | : 13/156991 | |
| DATED | : January 8, 2013 | |
| INVENTOR(S) | : Malvar et al. | |

It is certified that error appears in the above-identified patent and that said Letters Patent is hereby corrected as shown below:

On the title page, item (75), under "Inventors", in Column 1, Line 2, delete "L" and insert -- L. --, therefor.

In the Specification

In Column 1, Line 12, delete "10/916/721," and insert -- 10/916,721, --, therefor.

In Column 1, Line 39, delete "Fore" and insert -- For --, therefor.

In Column 8, Line 59, delete "ca be" and insert -- can be --, therefor.

Signed and Sealed this
Seventeenth Day of September, 2013

Teresa Stanek Rea
*Deputy Director of the United States Patent and Trademark Office*